(12) United States Patent
Salmon

(10) Patent No.: US 9,491,298 B2
(45) Date of Patent: *Nov. 8, 2016

(54) SYSTEM AND METHOD FOR PROCESSING A VOICE MAIL

(71) Applicant: Empire IP LLC, New York, NY (US)

(72) Inventor: Timothy Salmon, Basking Ridge, NJ (US)

(73) Assignee: Voice2Text Innovations LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,510

(22) Filed: Dec. 21, 2015

(65) Prior Publication Data

US 2016/0112571 A1 Apr. 21, 2016

Related U.S. Application Data

(63) Continuation of application No. 14/540,069, filed on Nov. 13, 2014, now Pat. No. 9,258,426, which is a continuation of application No. 13/445,884, filed on Apr. 12, 2012, now Pat. No. 8,914,003, which is a continuation of application No. 11/455,123, filed on Jun. 15, 2006, now Pat. No. 8,249,568.

(51) Int. Cl.
| | | |
|---|---|---|
| *H04L 29/08* | (2006.01) | |
| *H04M 3/533* | (2006.01) | |
| *H04M 1/725* | (2006.01) | |
| *G10L 15/26* | (2006.01) | |
| *H04W 4/14* | (2009.01) | |

(52) U.S. Cl.
CPC .......... *H04M 3/53366* (2013.01); *G10L 15/26* (2013.01); *H04M 1/7255* (2013.01); *H04M 3/53333* (2013.01); *H04W 4/14* (2013.01); *H04M 2201/60* (2013.01); *H04M 2203/4536* (2013.01)

(58) Field of Classification Search
CPC ... H04W 4/12; H04W 4/16; H04M 3/53366; H04M 3/53333; H04M 1/7255; H04M 2201/60; H04M 2203/4536; G10L 15/26
USPC ...... 455/563, 413, 414.4, 466, 412.1, 412.2; 379/1.02, 88.04, 88.07, 88.08, 88.13, 379/88.16, 88.26; 704/9, 235
See application file for complete search history.

(56) References Cited

U.S. PATENT DOCUMENTS

| | | |
|---|---|---|
| 5,930,700 A | 7/1999 | Pepper et al. |
| 6,212,550 B1 | 4/2001 | Segur |
| 6,507,643 B1 | 1/2003 | Groner |
| 6,732,151 B1 | 5/2004 | Tobias et al. |
| 7,224,774 B1 | 5/2007 | Brown et al. |
| 7,412,387 B2 | 8/2008 | Faisman et al. |
| 7,693,267 B2 | 4/2010 | Howell et al. |

(Continued)

FOREIGN PATENT DOCUMENTS

| | | |
|---|---|---|
| WO | 2004095821 A2 | 11/2004 |
| WO | WO2004095422 A2 | 11/2004 |

*Primary Examiner* — Amancio Gonzalez
(74) *Attorney, Agent, or Firm* — John R. Kasha; Kelly L. Kasha; Kasha Law LLC

(57) ABSTRACT

Described is a system and method for processing a voice mail. The method comprises receiving a voice mail, converting the voice mail into a text message using a predefined speech-to-text conversion algorithm and transmitting the text message to a wireless computing device.

5 Claims, 4 Drawing Sheets

(56) References Cited

U.S. PATENT DOCUMENTS

| | | | |
|---|---|---|---|
| 8,249,568 B2* | 8/2012 | Salmon | H04M 3/53333 379/1.02 |
| 8,548,441 B1 | 10/2013 | Jones et al. | |
| 8,914,003 B2 | 12/2014 | Salmon | |
| 9,258,426 B2* | 2/2016 | Salmon | H04M 3/53333 |
| 2004/0010579 A1 | 1/2004 | Freese | |
| 2004/0252679 A1* | 12/2004 | Williams | H04L 12/5692 370/356 |
| 2006/0166658 A1 | 7/2006 | Bennett et al. | |
| 2006/0223502 A1 | 10/2006 | Doulton | |
| 2006/0234680 A1 | 10/2006 | Doulton | |
| 2006/0281474 A1 | 12/2006 | Domville et al. | |
| 2007/0054678 A1 | 3/2007 | Doulton | |
| 2007/0116204 A1 | 5/2007 | Doulton | |
| 2007/0117543 A1 | 5/2007 | Doulton | |
| 2007/0117544 A1 | 5/2007 | Doulton | |
| 2007/0117545 A1 | 5/2007 | Doulton | |
| 2007/0117546 A1 | 5/2007 | Doulton | |
| 2007/0117547 A1 | 5/2007 | Doulton | |
| 2007/0124384 A1 | 5/2007 | Howell et al. | |
| 2007/0127631 A1* | 6/2007 | Difiglia | H04M 3/533 379/67.1 |
| 2012/0002794 A1 | 1/2012 | Jackson et al. | |

* cited by examiner

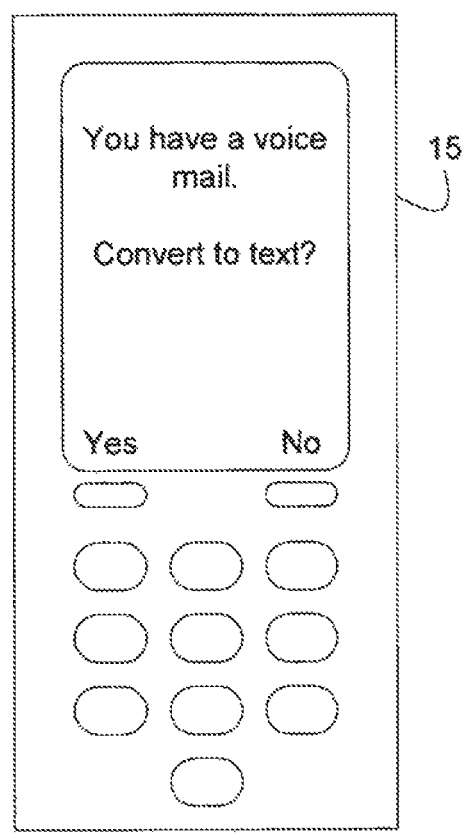

SYSTEM AND METHOD FOR PROCESSING A VOICE MAIL

CROSS-REFERENCE TO RELATED APPLICATION

This application is a continuation of U.S. patent application Ser. No. 14/540,069, filed Nov. 13, 2014, which is a continuation of U.S. patent application Ser. No. 13/445,884, filed Apr. 12, 2012, now U.S. Pat. No. 8,914,003, issued Dec. 16, 2014, which is a continuation of U.S. patent application Ser. No. 11/455,123, filed Jun. 15, 2006, now U.S. Pat. No. 8,249,568, issued Aug. 21, 2012, the disclosures of which are incorporated herein by reference.

BACKGROUND

A conventional communications network may employ a voice mail system which allows a caller to leave a voice mail for an intended recipient. For example, if the recipient is not available to take a call, the call is forwarded to a voice mailbox for the recipient which stores the voice mail left by the caller. The recipient then receives some indication that the voice mail is stored and accesses the voice mail system to retrieve the voice mail. To retrieve the voice mail, the recipient is typically required to dial into the voice mail system and provide a unique authentication code. After an authentication procedure (i.e., matching the authentication code to the voice mailbox), the recipient is provided access to the voice mailbox and may listen to the voice mail, as well as any other voice mails stored in the voice mailbox (e.g., previously listened to voice mails that were saved by the recipient). Requiring the recipient to dial into the voice mail system and enter the authentication code may take a significant amount of time.

SUMMARY OF THE INVENTION

The present invention relates to a system and method for processing a voice mail. The method comprises receiving a voice mail, converting the voice mail into a text message using a predefined speech-to-text conversion algorithm and transmitting the text message to a wireless computing device.

BRIEF DESCRIPTION OF THE DRAWINGS

FIG. 3a shows an exemplary embodiment of a notification message according to the present invention.

DETAILED DESCRIPTION

Figure 1:
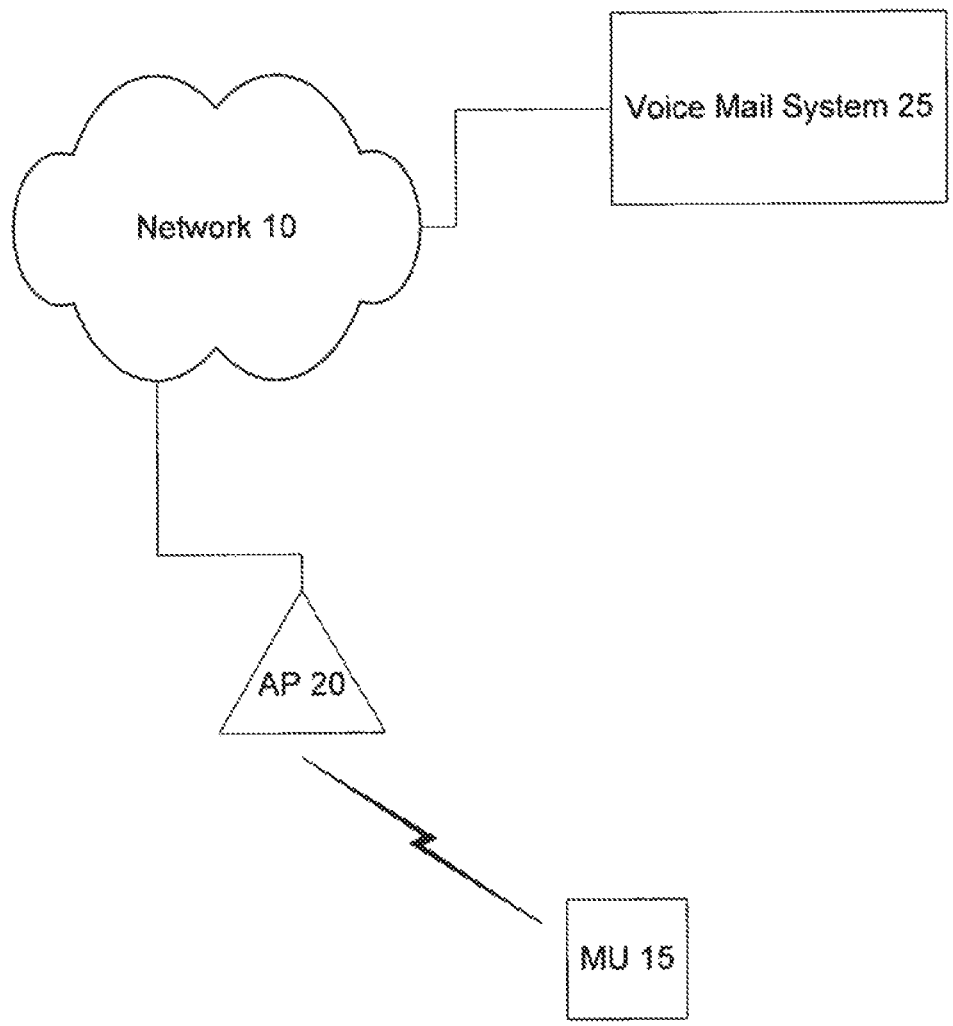
FIG. 1 shows an exemplary embodiment of a system for processing a voice message according to the present invention.

The present invention will be described with reference to the following description and the attached drawings, wherein like elements are provided with the same reference numerals. The present invention describes a system and method for processing a voice mail. In the exemplary embodiments of the present invention, the voice mail may be converted into a text message and/or email and delivered to a computing device. While the exemplary embodiments will be described with reference to a voicemail, the present invention may be applied to any digital audio data file, including but not limited to, WAV files, MP3 files, WMA files, etc. For example, digital audio files which are attachments to emails may be converted into text messages and/or emails.

FIG. 1 shows an exemplary embodiment of a system 5 for processing a voice mail according to the present invention. The system 5 may include a communication network 10 that is accessible by a mobile computing unit (MU) 15 via an access point (AP) 20. The network 10 may be, for example, a cellular communications network, a wireless local/wide area network, a satellite communication network, etc. In the exemplary embodiments, the MU 15 may be a handheld, wireless computing device (e.g., a mobile phone, a PDA, a tablet computer, a laptop, a digital media player, a gaming device, etc.) which is configured for voice communications, as well as transmitting/receiving text messages and/or emails. For example, the MU 15 may be configured to transmit/receive text messages in accordance with a Short Message Service (SMS) provided by the Global System for Mobile Communications (GSM) standard. The voice communications may be conducted in full- and/or half-duplex modes. Those of skill in the art will understand that the MU 15 may also be a stationary computing device, such as a PC which has access to the network 10 via a wired connection (e.g., Ethernet) and/or a wireless connection (e.g., a network interface card).

Those of skill in the art will understand that the MU 15 may include electrical components for conducting wireless communications, generating and storing data, executing applications, displaying content, etc. For example, the MU 15 may include a wireless transceiver for transmitting/receiving wireless signals in accordance with a predetermined wireless communication standard (e.g., GSM, 802.1x, iDEN, etc.). Additionally, the MU 15 preferably includes or is coupled to a display screen (e.g., LCD, CRT) for displaying text, images, a GUI, etc. The MU 15 also preferably includes or is coupled to an input arrangement (e.g., a keypad, a keyboard, a touch screen) allowing a user of the MU 15 to enter data, select/highlight items on the display screen, etc. Those of skill in the art will understand that the above-named components are exemplary and that the MU 15 may include or be coupled to any number of further components which correspond to various functionalities of the MU 15.

Referring back to FIG. 1, the system 5 further includes a voice mail system 25 which may be implemented in software and/or hardware (e.g., one or more computing/storage devices) and configured to store voice mails for one or more users. That is, the voice mail system 25 may provide individualized voice mail storage (e.g., a voice mailbox) for each MU in the system 5, i.e., the voice mailbox may be associated with a phone number or other identifier of the MU 15. For example, the voice mail system 25 may store a voice mail for the user of the MU 15 in a corresponding voice mailbox.

As is known in the art, the voice mail may be a digital audio data file which is generated for a variety of reasons. For example, the user may have been away from the MU 15 and/or the MU 15 may have been disconnected from the network 10 when a call was attempted, and, thus, not received the call. As such, a caller may have been redirected to the voice mail system 25 (in particular, the voice mailbox corresponding to the called number) and instructed to record a voice mail. In another instance, the caller may have dialed directly into the voice mailbox, desiring to generate the voice mail without having the MU 15 indicate an incoming call, e.g., ring, vibrate, LED flash, etc. In yet a further instance, the voice mail may be deposited in voice mailboxes for a plurality of users. For example, the voice mail may be a system message created by an administrator of the voice mail system 25 (or the network 10) informing the users about a change, update, temporary disabling, etc. Alternatively, the voice mail may be an advertisement which is deposited in the voice mailboxes for the plurality of users.

When the voice mail system 25 has stored the voice mail, a voice mail notification message may be transmitted to the MU 15 informing the user that the voice mail is stored by the voice mail system 25. As is known in the art, the notification message may be transmitted after a new voice mail has been stored by the voice mail system 25. That is, the notification message may only be transmitted once for each voice mail at a time when the voice mail is initially received. However, as is known in the art, the voice mail system 25 may store voice mails even after they are listened to by the user (e.g., when the user does not delete the voice mail, when the user indicates that the voice mail should be saved, etc.). That is, the voice mail system 25 typically provides the user the option of saving or deleting the voice mail after it has been retrieved.

In the exemplary embodiment of the present invention, the notification message further includes a voice-to-text conversion message/query. That is, the voice mail system 25 (or another component on the network 10) may be configured to convert the voice mail into a text message and/or an email. For example, the voice mail system 25 may utilize a speech-to-text conversion module which converts the digital audio data in the voice mail into a text message and/or an email. As understood by those of skill in the art, the caller's speech (sound waves) may have been digitized by a caller device (any voice-enabled communication device). The digital audio data is then stored as the voice mail in the user's voice mailbox by the voice mail system 25. The conversion module converts the digital audio data into basic language units and then into words. Optionally, the conversion module may perform a contextual analysis to ensure that the words are spelled correctly and are linked in grammatically correct ways. The conversion module may utilize a speech-to-text conversion algorithm which, for example, converts continuous speech into text or segments the digital audio data into segments (e.g., individual words, syllables, sounds, by pauses, etc.) to ensure that each word is properly converted into text.

While the exemplary embodiment states that the conversion module is utilized by the voice mail system 25, those of skill in the art will understand that the speech-to-text conversion may be accomplished by another device communicatively linked to the voice mail system 25. For example, GSM networks typically utilize a Short Message Service Center (SMSC) as routing hubs for transmitting SMS messages. Thus, the conversion module may be located at the SMSC. Alternatively, the user may use the MU 15 to reroute calls which are not received to a further voice mailbox. For example, when the user is on another call the call may be re-routed to a Call Forward Busy number, and when the user does not answer the call the call may be re-routed to a Call Forward No Reply number. In the exemplary embodiment, these numbers are configured to dial into the voice mailbox of the user maintained by the voice mail system 25. However, the numbers may be reconfigured by the user (on the MU 15) or by the voice mail system 25 at the user's request to route calls to the further voice mailbox on the voice mail system 25 or a further device which utilizes the conversion module.

Upon receipt of the notification message, the user may choose to listen to the voice mail or convert the voice mail into a text message. Listening to the voice mail be enacted as is conventionally known, i.e., dialing into the voice mail system 25 and providing a voice mail authentication code. If the user indicates that the voice mail should be converted into a text message, the user may be prompted to enter an authentication code which may be included in a text message sent to the voice mail system 25. For example, the voice mail system 25 may be configured to transmit and respond to text messages in accordance with the SMS or email. The authentication code may be the same as the voice mail authentication code or a unique voice mail-to-text message conversion code. The voice mail system 25 utilizes the authentication code to ensure an identity of the user. When the authentication code is verified, the voice mail may be converted into a text message (and/or email) and delivered to the MU 15.

As is known by those of skill in the art, some text message delivery protocols only support a limited payload, i.e., predefined number of alphanumeric and/or punctuation characters per text message. In the case when the voice mail is converted into a text message having a greater number of characters than allowed in a single text message, the text message may be segmented into a plurality of segmented text messages and delivered in succession (or a bundle) to the MU 15. A check may be provided to ensure that a division of the text message does not divide a word, is not in a middle of a sentence, etc.

In an alternative exemplary embodiment, upon receipt of the voice mail, the voice mail system 25 may determine whether the user has indicated that all (or selected ones of the voice mails) should be converted to text messages. For example, the user may instruct the voice mail system 25 (while subscribing or remotely with the MU 15) that all voice mails, or voice mails from a particular caller(s), should be converted to text and delivered to the MU 15 as text messages.

Figure 2:
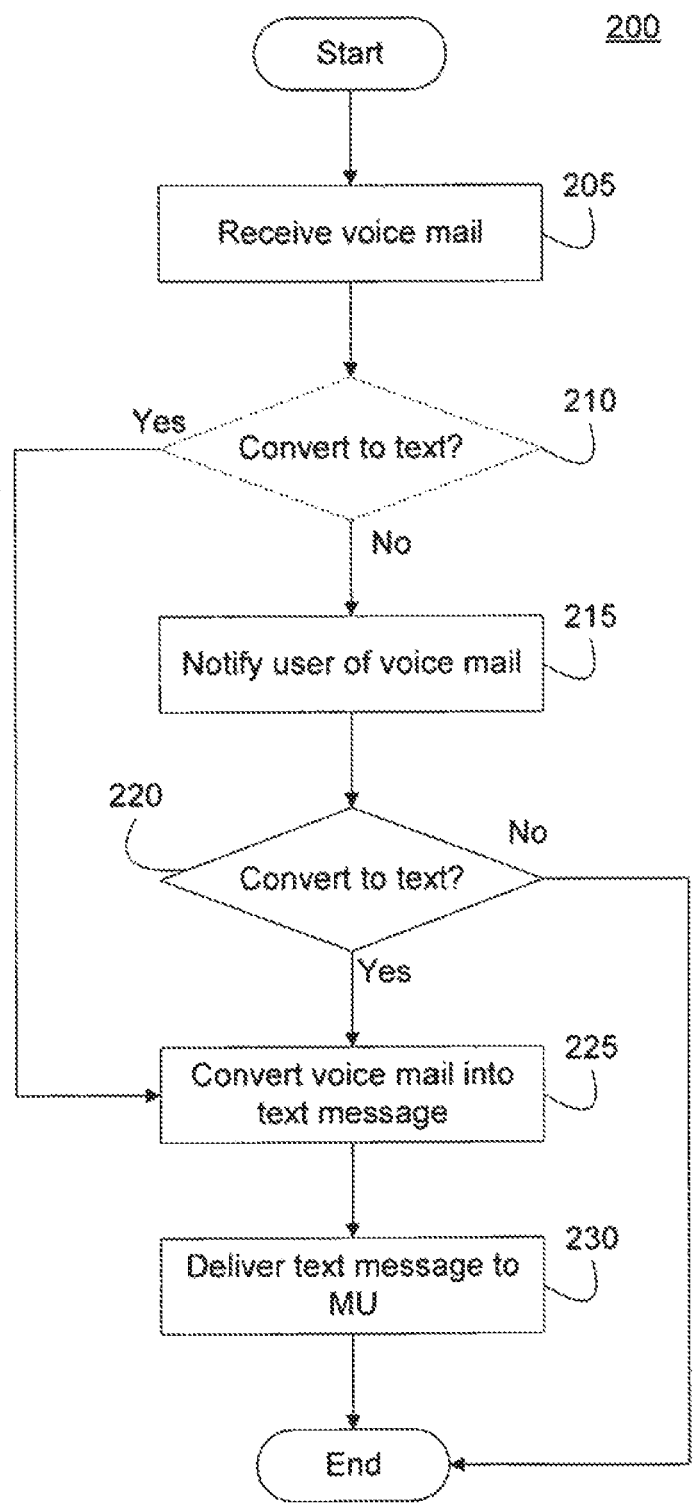
FIG. 2 shows an exemplary embodiment of a method for processing a voice message according to the present invention.

FIG. 2 shows an exemplary embodiment of a method 200 for processing a voice mail according to the present invention. In step 205, the voice mail system 25 receives the voice mail. As stated above, the voice mail system 25 may be part of the network 10 or may be a stand-alone system for storing voice mails for a plurality of users (e.g., subscribers). The voice mail system 25 may allow the caller to generate the voice mail, or may receive the voice mail from another device on the network 10.

In optional step 210, the voice mail system 25 may determine whether the voice mail should be automatically converted into a text message and/or an email. For example, the user of the MU 15 may have indicated that all voice mails, or voice mails generated by a selected caller(s) (as identified by a phone number of the caller) should be automatically converted into text and delivered to the MU 15 as text messages. Thus, in step 210, the voice mail system 25 may compare a source identifier of the voice mail (e.g., the caller's phone number) to a list of one or more source identifiers for which the user has indicated that voice mails from the corresponding source(s) should be automatically converted into text messages and delivered to the MU 15. Similarly, the user may create a further list of one or more further source identifiers for which voice mails should never be, or require the user's authorization to be, converted to text messages.

In step 215, the voice mail system 25 notifies the user that the voice mail is stored at the voice mail system 25. For example, the notification message may be transmitted to the MU 15 notifying the user of the voice mail. As shown in FIG. 3a, the notification message may include a notification portion stating "You have a new voice mail" and a conversion portion asking "Convert the voice mail to a text message?" The notification message may further include description data indicating a source of the voice mail, a time/date of its creation, whether it is new or has been listened to, etc.

In step 220, the voice mail system 25 determines whether the voice mail should be converted into a text message by analyzing a response to the notification message. The response may be generated by, for example, pressing a button and/or touching a portion of the screen of the MU 15 to indicate that the voice mail should or should not be converted into a text message. If the user indicates that the voice mail should not be converted into a text message, the MU 15 may display a prompt to retrieve the voice mail by dialing into the voice mail system 25, as shown in FIG. 3c. The user then may retrieve the voice mail by dialing into the voice mail system 25 as is conventionally known.

Figure 3B:
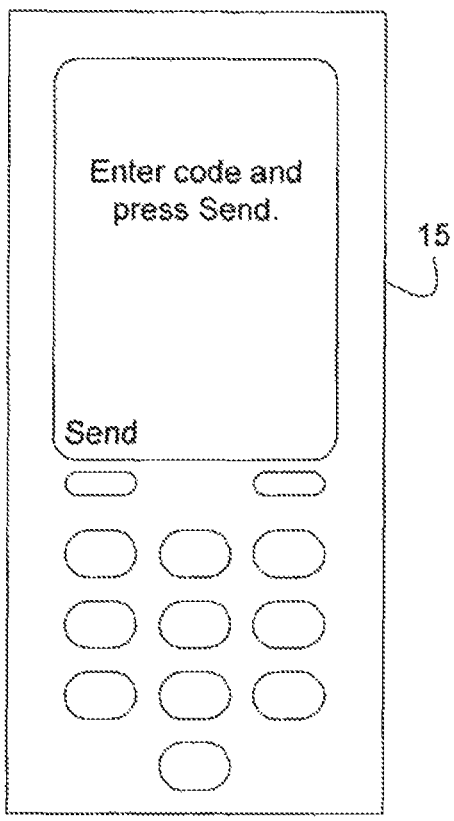
FIG. 3b shows an exemplary embodiment of an authentication query according to the present invention.
Figure 3C:
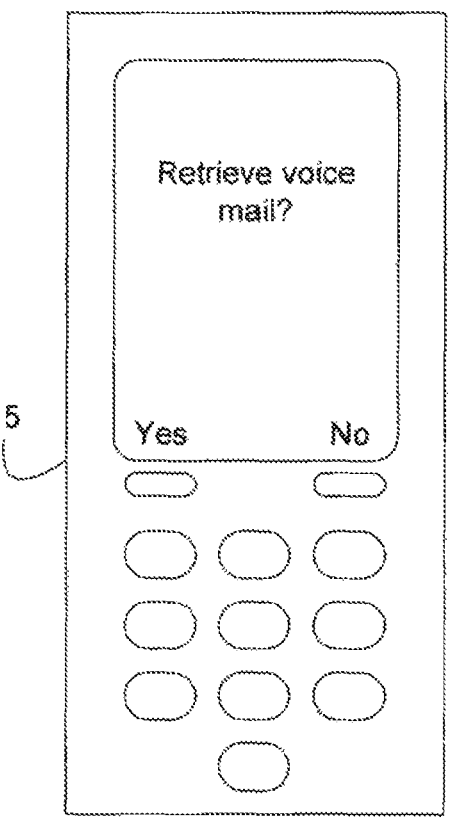
FIG. 3c shows an exemplary embodiment of a voice mail retrieval prompt according to the present invention.

If the user responds to the conversion portion in the affirmative, an authentication query, as shown in FIG. 3b, may be presented on the MU 15, prompting the user to enter the authentication code. When the user enters the authentication code, a response message including the authentication code is transmitted from the MU 15 to the voice mail system 25. The response message may be a response text message (e.g., SMS message) delivered to the voice mail system 25. For example, the MU 15 may be configured with an address (e.g., a phone number) of the voice mail system 25 and/or a text-message receiving module thereof. As noted above, the response message may be transmitted to any device on the network 10 which includes the conversion module. Preferably, the device having the conversion module stores or has access to the voice mail box for the MU 15 and may communicate with the MU 15 using text messages or emails. In the exemplary embodiment, the voice mail system 25 may detect the authentication code in the response message and then authenticate the user by comparing the authentication code to a stored authentication code for the voice mail box in which the voice mail is stored. When the authentication code is valid, the method 200 proceeds.

In step 225, the voice mail is converted into a text message. As explained above, the digital audio data may be converted into basic language units and then into words using the speech-to-text conversion algorithm. A contextual analysis may also be performed to ensure that the words are spelled correctly and are associated with each other in grammatically correct ways. Literal (phonetic) conversions may be provided for unintelligible words/phrases, or the conversion module may substitute a closest-fit word when compared to a dictionary. The conversion module may parse the voice mail into individual words to ensure that each word is properly converted into text.

In step 230, the text message is delivered to the MU 15. In one exemplary embodiment, the text message is delivered in accordance with the SMS which is defined in GSM recommendation 03.40. The voice mail system 25 may include, utilize or act as the SMSC which transmits the text message to the MU 15 using a predefined protocol such as, for example, SS7 within a standard GSM map framework, TCP/IP within the standard GSM map framework, etc. As is known in the art, conventional SMS attempts to deliver a message to the MU 15 according to a "best effort" assurance. However, when the text message is a converted voice mail, a higher level of assurance may be utilized to ensure that the text message is delivered, i.e., the delivery may be attempted until acknowledged by the MU 15.

As described above, the voice mail may be converted into a plurality of text messages, because, according to some text message delivery protocols, the text message has a predetermined payload which is limited to a predetermined number of characters (e.g., alphanumeric, punctuation, etc.). In this embodiment, the voice mail system 25 may deliver the plurality of text messages to the MU 15, which may be read as separate text messages or compiled into a single text message.

In a further exemplary embodiment, the voice mail may also, or alternatively, be converted into an email. That is, the voice mail system 25 may store an email address which is associated with the voice mail box. When the user indicates that the voice mail should be converted to a text message, the text message may also be delivered as an email (e.g., SMTP) to the email address. For example, after the user responds to the conversion portion of the notification message, an email prompt may be presented by the MU 15 asking the user whether, along with the text message, an email should be generated and delivered to the email address. The email may be retrieved using the MU 15 or another computing device which provides access to the user's email service.

In another exemplary embodiment, the text message may be translated into a different language based on a source or destination of the call. For example, if a Korean speaker is the caller, the voice mail may be converted into a text message in Korean. If the recipient is an English speaker, the text message may be translated from Korean to English. Alternatively, the voice mail may be translated prior to conversion into the text message, i.e., the digital audio data may be translated into the different language and then converted into a text message.

In another exemplary embodiment of the present invention, the user may use the MU 15 to retrieve a voice mail summary as a text message. For example, a plurality of voice mails may be stored in the voice mail box associated with the MU 15. The user may transmit a summary inquiry message (as a text message) to the voice mail system 25 and receive a summary message (as a text message) providing a description of each voice mail stored in the voice mail box. The description may include a caller identification (e.g., phone number, user ID), a time/date of the call and a length in time (and/or size) of the voice mail. Using the MU 15, the use may select a voice mail on the summary message for conversion into a text message. A selection message may be transmitted to the voice mail system 25 indicating a selected voice mail for conversion to a text message. The voice mail system 25 may then convert the selected voice mail into a text message and deliver it to the MU 15, as described above.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
   a voice mail system adapted to receive and store a voice mail for a user;

an another device communicatively linked to the voice mail system over a wide area network, the another device including a speech-to-text conversion module adapted to convert the voice mail from audio data into text data; and wherein the voice mail system includes a communication module transmitting the voice mail to the another device, receiving the text data from the another device, and transmitting the text data in an email message to an email address associated with the user.

2. The system according to claim 1, wherein the email message includes a digital audio file corresponding to the voice mail.

3. The system according to claim 1, wherein the communication module transmits a notification message to a device associated with the user, wherein the notification message informs the user that the voice mail is stored by the voice mail system.

4. The system according to claim 3, wherein the notification message includes description data associated with the voice mail, wherein the description data comprises at least one of a source of the voice mail, a time of the voice mail, and a date of the voice mail.

5. The system according to claim 1, wherein the communication module transmits the text data in an SMS message to an SMS address associated with the user.

\* \* \* \* \*